United States Patent [19]

Endo

[11] Patent Number: 4,634,272

[45] Date of Patent: Jan. 6, 1987

[54] OPTICAL RADAR SYSTEM WITH AN ARRAY OF PHOTOELECTRIC SENSORS

[75] Inventor: Hiroshi Endo, Yokosuka, Japan

[73] Assignee: Nissan Motor Company, Limited, Japan

[21] Appl. No.: 478,871

[22] Filed: Mar. 25, 1983

[30] Foreign Application Priority Data

Jun. 2, 1982 [JP] Japan ................... 57-94477

[51] Int. Cl.⁴ .................... G01C 3/08; G01C 1/00
[52] U.S. Cl. ........................ 356/5; 356/141; 356/152
[58] Field of Search ............. 356/4, 5, 28, 141, 152; 250/211 J; 358/213

[56] References Cited

U.S. PATENT DOCUMENTS

| | | | |
|---|---|---|---|
| 3,786,263 | 1/1974 | Michon | 250/211 J X |
| 3,846,026 | 11/1974 | Waters | 356/5 |
| 3,848,999 | 11/1974 | Dall'Armi | 356/5 |
| 3,954,340 | 5/1976 | Blomqvist et al. | 250/216 X |
| 4,209,806 | 6/1980 | Koike et al. | 357/24 X |
| 4,253,752 | 3/1981 | Ichihara | 356/4 |
| 4,274,735 | 6/1981 | Tamura et al. | |
| 4,303,335 | 12/1981 | Matsuda et al. | 356/4 |
| 4,315,689 | 2/1982 | Goda | 356/5 |
| 4,317,991 | 3/1982 | Stauffer | 356/4 |
| 4,344,705 | 8/1982 | Kompa et al. | 356/5 |
| 4,355,895 | 10/1982 | Cairns et al. | 356/141 |
| 4,391,515 | 7/1983 | Forrester et al. | 356/5 |
| 4,518,256 | 5/1985 | Schwartz | 356/5 |

FOREIGN PATENT DOCUMENTS

| | | |
|---|---|---|
| 1473999 | 2/1978 | Fed. Rep. of Germany . |
| 2714178 | 10/1978 | Fed. Rep. of Germany . |
| 3010137 | 12/1979 | Fed. Rep. of Germany . |
| 2920951 | 12/1979 | Fed. Rep. of Germany . |
| 2647209 | 2/1980 | Fed. Rep. of Germany . |
| 1534093 | 11/1978 | United Kingdom . |

OTHER PUBLICATIONS

Official Action issued by the German Patent Office In re 3315288.8-35, Germany.

*Primary Examiner*—Stephen C. Buczinski
*Assistant Examiner*—Linda J. Wallace
*Attorney, Agent, or Firm*—Lowe, Price, LeBlanc, Becker & Shur

[57] ABSTRACT

An optical radar system includes an optical transmitter which responds to a drive signal to radiate a search light pulse into detection fields arranged in the direction in which the vehicle is moving. An optical receiver includes a plurality of arrayed photoelectric sensitive elements which receive any search light pulses reflected by objects in the detection fields. A distance measuring device determines the respective distances from the system to the objects and the corresponding directions in which the objects lie in accordance with the delay between the drive signal and the reception of the corresponding reflected search light pulses by the individual photoelectric elements.

19 Claims, 6 Drawing Figures

| 26a1 | 26b1 | 26c1 |
|------|------|------|
| 26a2 | 26b2 | 26c2 |
| 26a3 | 26b3 | 26c3 |

OPTICAL RADAR SYSTEM WITH AN ARRAY OF PHOTOELECTRIC SENSORS

BACKGROUND OF THE INVENTION

The present invention relates to an optical radar system which determines the respective distances from the system to detected objects and the respective directions toward the objects with respect to the system.

A conventional optical radar system adapted to be mounted on the front of an automotive vehicle includes an optical transmitter, an optical receiver, and a signal processor. The transmitter radiates a search pulse of coherent light produced by a semiconductor laser in a beam having an appropriate angle of divergence toward the object to be detected. The optical receiver collects the light pulses reflected by the object using a lens, eliminates the background noise from the collected light pulses using an interference filter and focuses the filtered light onto a single photo transducer. The resulting pulse signal from the photo transducer is amplified to an appropriate magnitude by a wide-band amplifier in the processor. A computing unit of the processor determines the distance from the radar system to the object in accordance with the delay between the arrival of the reflected pulse and the occurrence of a drive signal which triggers the transmitted pulse of coherent light, as well known in the art.

In this conventional radar system, however, the area of the light-receiving surface of the light sensitive element is very small so that the region in which the reflected pulses can be sensed is limited to a very small area forward of the optical receiver. For example, when an automotive vehicle is travelling along the axis of the transmitted pulse beam forwardly of the automotive vehicle on which the optical radar system is mounted, the distance between the preceding vehicle and the following vehicle can be computed. However, when the preceding vehicle leaves the sensible area due to a curved or sloped road, the radar system gives out information such as would be given out when there are no preceding vehicles, which is an undesirable matter.

SUMMARY OF THE INVENTION

According to the present invention, an optical radar system includes an optical receiver which in turn includes a plurality of arranged photoelectric sensitive elements, and a distance measuring device which determines the respective distances from the system to objects and the respective directions toward the objects with respect to the system in order to find objects and avoid possible obstacles in the directions in which the vehicle equipped with the system moves.

DETAILED DESCRIPTION OF THE PREFERRED EMBODIMENT

Figure 1:
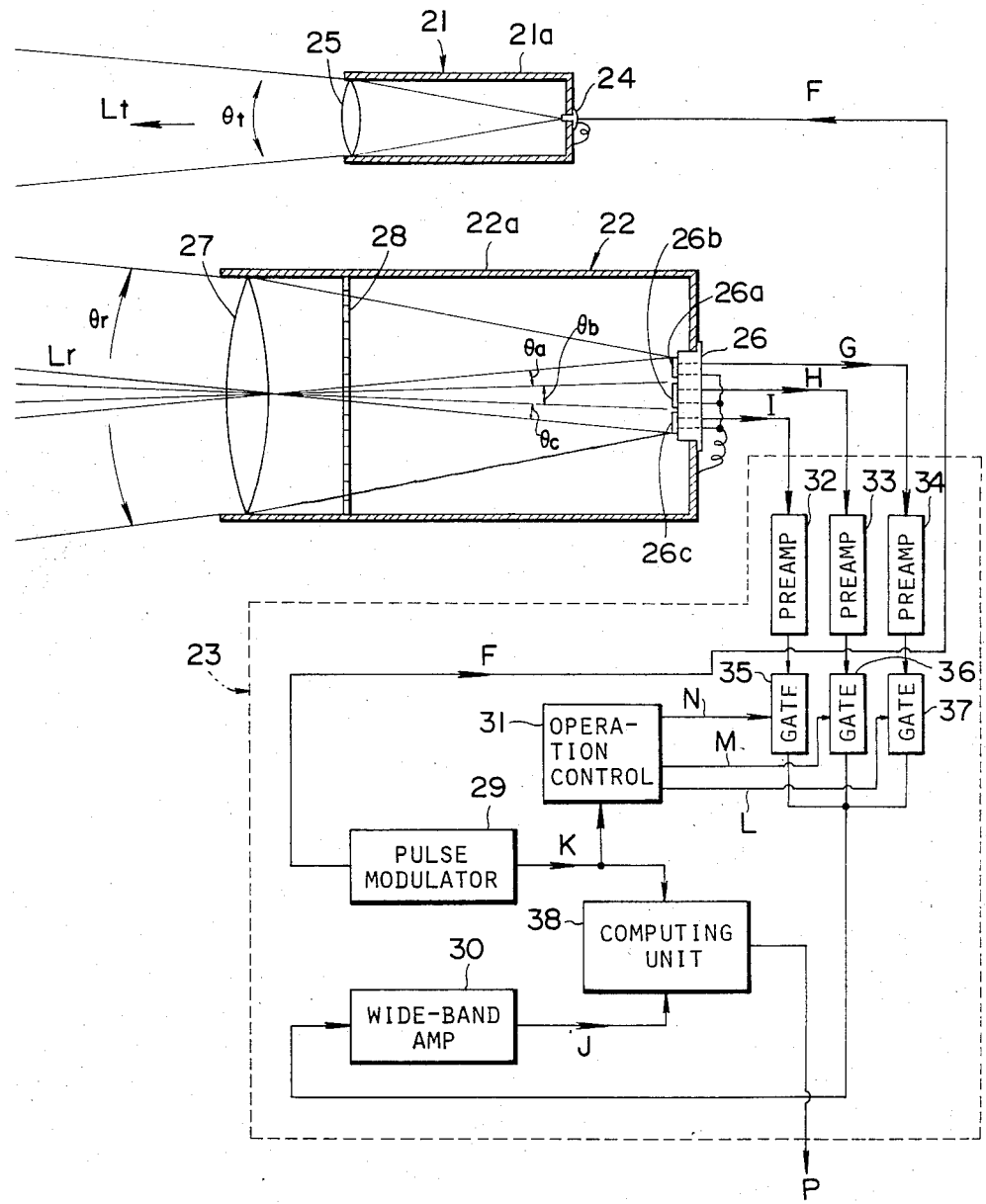
FIG. 1 is a schematic illustration of a preferred embodiment of an optical radar system according to the present invention.

Referring to FIG. 1, there is shown a preferred embodiment of an optical radar system according to the present invention. The system includes a phototransmitter 21, an optical receiver 22 and a signal processor 23. Phototransmitter 21 includes a light-emitting element 24 positioned at one end of a housing 21a. The light-emitting element 24 is activated by a drive signal F produced by a pulse modulator 29 of signal processor 23 to produce a search pulse Lt of coherent light. The housing 21a also supports a collecting convex lens 25 in a fixed spatial relationship with the light-emitting element 24. Search pulse Lt is transmitted through the lens 25 towards objects to be detected in the form of a beam of coherent light with angle of divergence $\theta t$. Light emitting element 24 may be a semiconductor laser.

Optical receiver 22 collects the part Lr of search signal Lt reflected by the objects by way of a convex lens 27 positioned in a housing 22a, removes the background noise light using an interference filter 28 behind lens 27 and focuses the filtered light onto a photoelectric transducer 26 positioned at one end of housing 22a. The photo-sensitive surface of transducer 26 is made up of three independent areas 26a, 26b and 26c aligned in the horizontal plane which includes the optical axis of lens 27. Areas 26a, 26b and 26c are rectangular and of the same size.

Figure 2:
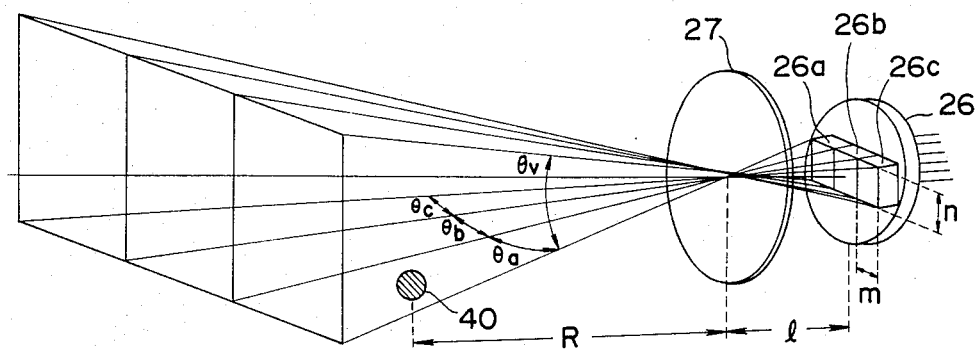
FIG. 2 is an illustration of the combination of arrayed photo sensitive elements and a lens and the resulting detection zones.

The range $\theta r$ over which photoelectric transducer 26 can sense reflected light Lr is the sum of the sub-ranges $\theta a$, $\theta b$ and $\theta c$ of each of the respective areas 26a, 26b and 26c, as shown in FIG. 2.

If the distance between an object 40 and lens 27 is represented by R, the focal distance by f, and the distance between lens 27 and photoelectric transducer 26 by l, the following formula holds:

$$1/R + 1/l = 1/f \tag{1}$$

Since R is much greater than f, l essentially equals f. Thus, the reflected light Lr is focused onto photoelectric transducer 26.

If the dimensions of each of the rectangular light-receiving areas 26a, 26b, 26c have length m and width n, the respective detection field angles $\theta a$, $\theta b$ and $\theta c$ and the transverse detection field angle $\theta v$ are given by:

$$\theta a = \theta b \approx \theta c \approx 2 \tan^{-1} m/2f \tag{2}$$

$$\theta v \approx 2 \tan^{-1} n/2f \tag{3}$$

Signal processor 23 determines the respective distances from the system to the objects lying within the detection fields corresponding to transducers 26a, 26b and 26c on the basis of the electrical signals G, H and I from transducers 26a, 26b, 26c, respectively. The processor includes preamplifiers 32, 33 and 34 which amplify the electrical signals G, H and I respectively, an operation control unit 31 which repeatedly produces respective gating signals L, M and N in a fixed time sequence in response to the pulses of a triggering signal K from pulse modulator 29 in synchronism with the pulses of drive signal F, gates 37, 36 and 35 opened by gating signals L, M and N respectively, a wide-band amplifier 30 which respectively amplifies and shapes the signals G, H and I sequentially outputted by preamplifiers 32, 33, 34 and a computing unit 38 which determines the respective distances from the system to the objects in accordance with the timing J of the output of wideband amplifier 30 and triggering signal K and outputs distance data P for each of the detection fields in which an object is present.

Figure 3:
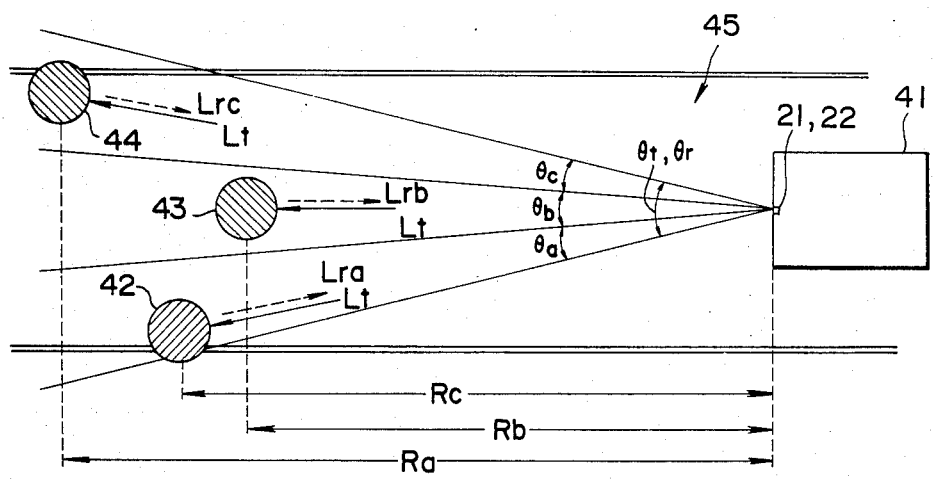
FIG. 3 is an illustration of the geometry of detection of several objects lying in different directions with respect to the axis of the radar system.

The operation of the optical radar system according to the present invention will be described with respect to FIG. 3 in which the detection of three objects is illustrated. As shown, phototransmitter 21 and optical receiver 22 of the system are centrally mounted on the front end of the vehicle body. The angle of divergence $\theta t$ of search beam Lt from transmitter 21, which naturally equals the angular detection range $\theta r$ of optical receiver 22, is chosen so as to approximately cover the width of the road lane (e.g., about 3.5 m) when a safe inter-vehicle distance (e.g., about 50 m) is maintained. The photo-sensitive elements 26a, 26b and 26c are set to sense reflected light from the left-forward, central-forward and right-forward directions respectively with respect to the axis of the system.

Figure 4:
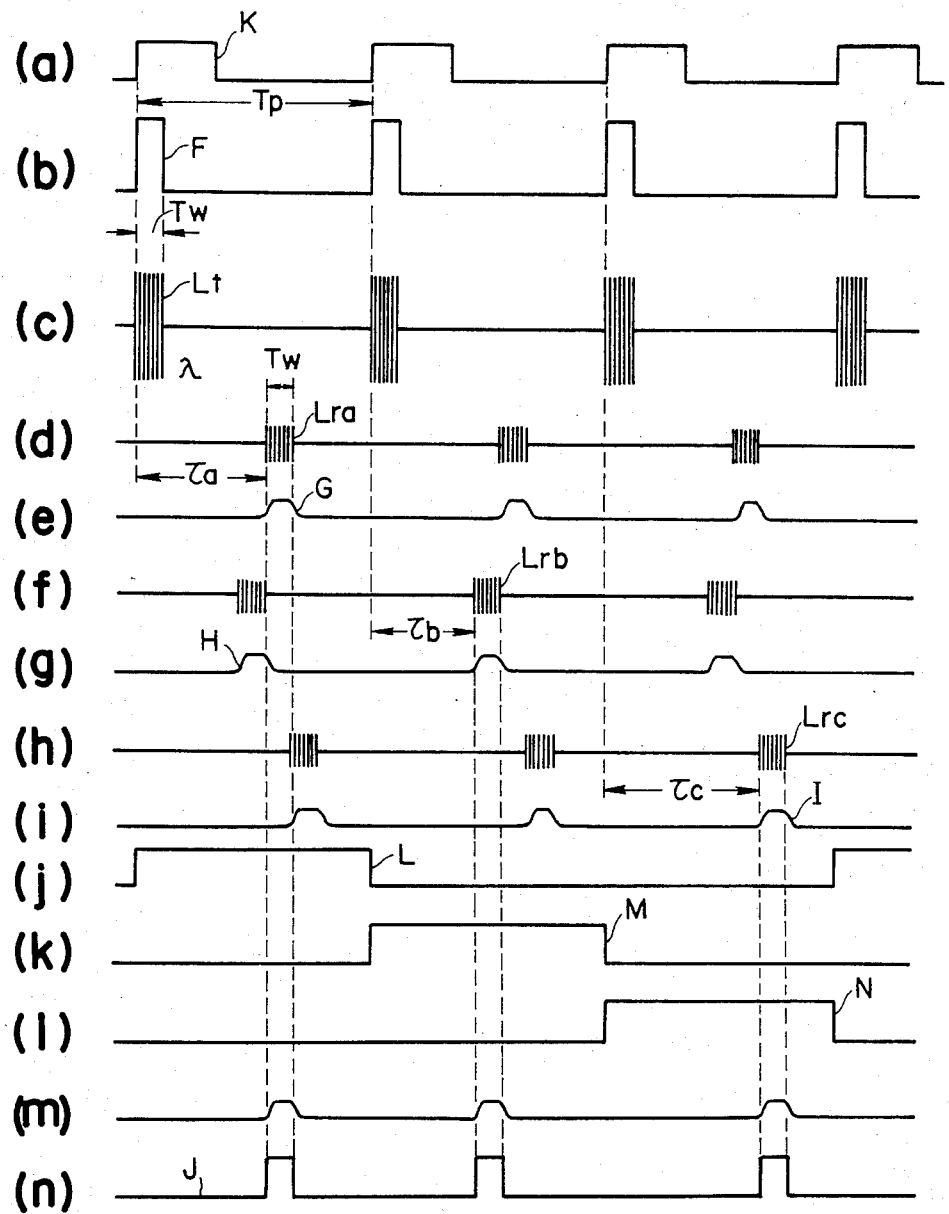
FIG. 4 is a timing chart of the operation of the radar system according to the present invention.

Assume that drive signal F having period Tp and pulsewidth Tw, as shown in FIG. 4(b), is outputted by pulse modulator 29, and a search light pulse having wavelength $\lambda$ and pulsewidth Tw is transmitted. If there are moving objects such as motorcycles 42, 43, 44 at respective distances Ra, Rb and Rc in front of the radar system within the detection fields $\theta a$, $\theta b$ and $\theta c$, the light pulses Lra, Lrb and Lrc reflected by the respective motorcycles and returning to photo-receiver 22 arrive at receiver 22 delayed respectively by times $\tau a$, $\tau b$ and $\tau c$ with respect to the timing of transmission of searchlight Lt, as shown in (d), (f) and (h) in FIG. 4. The reflected light pulses Lra, Lrb and Lrc received by receiver 22 are focused by lens 27 onto photoelectric elements 26a, 26b and 26c which output signals G, H and I indicative of the reflected light pulses Lra, Lrb and Lrc, respectively to signal processor 23. Signals G, H and I are amplified by 20–30 dB by preamplifiers 32, 33 and 34 and outputted to gates 35, 36 and 37, respectively.

Gates 35, 36 and 37 are supplied with gating signals L, M and N, as shown at (j), (k), and (l) in FIG. 4, which go high sequentially in response to triggering signal K, as shown in (a) in FIG. 4 in synchronism with drive signal F from operation control unit 31 to cause signals G, H and I to pass alternatingly through the corresponding gate. The output terminals of gates 35, 36 and 37 are connected so that the sequentially gated pulses G, H, and I are concatenated to form a serial signal, as shown in (m) in FIG. 4. Wide-band amplifier 30 amplifies and shapes the serial signal pulses into a timing signal, J, such as is shown at (n) in FIG. 4, outputted to computing unit 38. Computing unit 38 determines the distances Ra, Rb and Rc to respective objects 42, 43, and 44 on the basis of the respective delay intervals $\tau a$, $\tau b$ and $\tau c$ of timing pulses of signal J with respect to the corresponding pulses of trigger signal K and outputs distance data P for each of the detection fields in which an object is present.

As described above, the possible movement of objects can be predicted by monitoring changes in the distances to the objects in the right-, left- and central-forward detection fields with respect to the axis of vehicle 41. For example, assume that at first a vehicle is detected within the central detection field so that photoelectric sensitive element 26b is first outputting a signal and then photoelectric sensitive element 26c outputs a signal and subsequently stops outputting the signal. This fact indicates that the detected vehicle may have entered a curve to the right with respect to the directions shown in FIG. 3.

Figures 5, 6:
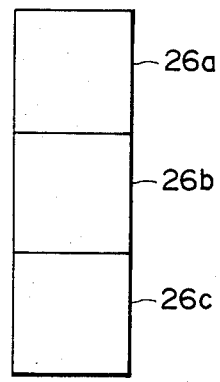
FIGS. 5 and 6 are illustrations of other arrangements of photo-sensitive elements.

While the above embodiment employs a plurality of photoelectric sensitive elements aligned transversely in a single line, the photoelectric sensitive elements may alternatively be aligned vertically in a single line, as shown at 26a, 26b, 26c in FIG. 5, or may be arranged in a matrix, as shown at 26a1, 26a2, 26a3; 26b1, 26b2, 26b3; 26c1, 26c2, 26c3 in FIG. 6.

An increase in the number of photoelectric sensitive elements would enable the sizes and shapes of objects to be sensed.

Such an optical system may be mounted on airplanes for the same purpose.

While the present invention has been described and shown in terms of a preferred embodiment thereof, it is not limited to the particular embodiment. Various changes and modifications could be easily made by those skilled in the art without departing from the scope of the present invention as set forth in the attached claims.

What is claimed is:

1. A system for measuring a distance to an object, comprising:
    a. first means responsive to a predetermined drive signal for transmitting a coherent pulsating light to a detection region of predetermined dimensions and orientation with respect to the system;
    b. second means including means for collecting a portion of the coherent pulsating light reflected by the object in the detection region and a plurality of arrayed photo-sensitive elements each monitoring a distinct light receiving area of said detection region and receiving the collected coherent light reflected from objects therein; and
    c. third means for generating and outputting the drive signal to said first means and determining the distance to the object in the detection region on the basis of the difference in time between an output timing of the drive signal and timing of reception of a received electric signal derived from each said light receiving area of said plurality of arrayed photo-sensitive elements,
    said third means comprising means for sequentially processing the received electric signals from each of said plurality of photo-sensitive elements within a sequence of predetermined time periods and
    means for measuring a time within each of said predetermined time periods for reception of reflected light by the photo-sensitive elements,
    thereby determining a time for transit of said light pulse to an object in said light receiving area monitored by the photo-sensitive elements.

2. The system according to claim 1, wherein said third means includes means for sequentially determining the distance between the system and each object.

3. The system according to claim 2, wherein said plurality of arrayed photo-sensitive elements are aligned horizontally in a single line.

4. The system according to claim 2, wherein said plurality of arrayed photo-sensitive elements are aligned vertically.

5. The system according to claim 2, wherein said plurality of arrayed photo-sensitive elements are arranged in the form of a matrix.

6. The system according to claim 1 wherein said third means is further operable for determining an orientation of the object on the basis of said difference in time.

7. Apparatus as recited in claim 1 wherein said means for sequentially processing includes means for providing outputs of each of said plurality of photo-sensitive elements in a time-multiplexed arrangement to said means for measuring time.

8. Apparatus as recited in claim 7 wherein said means for sequentially processing further includes gating means for sequentially gating said outputs of said plurality of photo-sensitive elements onto a single line thereby to provide a concatenated sequence of signals to said means for measuring time for sequentially measuring time differences between reflected light from sequential ones of said photo-sensitive elements and a reference time corresponding to a transmission time of said pulsating light.

9. An apparatus as recited in claim 8 wherein said gating means comprises a plurality of gates having respective input terminals respectively connected for receiving output signals from said outputs of said photo-sensitive elements and having output terminals, said output terminals connected to said single line, and wideband amplifying means connected to receive said output signals sequentially from said single line and for shaping said output signals and for providing the shaped signals to said means for measuring time.

10. An optical radar system for a vehicle comprising:
   a. an optical transmitter responsive to the pulses of a drive signal to emit corresponding pulses of light;
   b. means for directing the propagation of each pulse so as to cover a predetermined detection region;
   c. a plurality of photo-sensitive elements, each responsive to incident pulses of light to produce sensor pulse signals;
   d. means for focussing light reflected from said emitted light pulses by objects within said detection region onto said photo-sensitive elements such that said detection region is subdivided into a plurality of detection fields, the reflected light from each of said fields being focussed onto exactly one of said photo-sensitive elements; and
   e. a processing unit responsive to said drive signal and said sensor signals for sequentially determining whether or not objects capable of reflecting light exist in any of said fields of said detection region and further for sequentially determining the distance and direction to detected objects on the basis of a time delay between pulses of said drive signal and corresponding pulses of said sensor signals.

11. Apparatus as recited in claim 10 wherein said processing unit comprises means for sequentially enabling passage of said sensor signals to a means for measuring a time of reception of said respective sensor signals within respective predetermined time periods thereby determining a time for transit of said light pulse to an object within said fields of said detection region to identify a distance between said object and the vehicle.

12. Apparatus for determining longitudinal distances to objects in a plurality of transverse detection areas in a zone, comprising:
   transmitter means for transmitting a coherent light pulse longitudinally to said zone,
   a plurality of detecting means each operable for detecting presence of an object in a corresponding one of said transverse direction areas, each of said plurality of detecting means comprising photo-sensitive means; and
   distance measuring means for determining respective longitudinal distances to objects detected in corresponding detection areas,
   said distance measuring means comprising means for sequentially processing the reflected signals detected by said plurality of photo-sensitive means within a sequence of predetermined corresponding time periods and
   means for measuring a time within each of said predetermined time periods for reception of reflected light by the photo-sensitive means,
   thereby determining a time for transit of said light pulse to an object in said detection area monitored by the photo-sensitive means.

13. Apparatus as recited in claim 12 wherein said plural photo-sensitive means are disposed in the vicinity of said transmitter means.

14. Apparatus as recited in claim 12 wherein said means for sequentially processing includes means for providing outputs of each of said plurality of photo-sensitive means in a time-multiplexed arrangement to said means for measuring time.

15. Apparatus as recited in claim 14 wherein said means for sequentially processing further includes gating means for sequentially gating said outputs of said plurality of photo-sensitive means onto a single line thereby to provide a concatenated sequence of signals to said means for measuring time for sequentially measuring time differences between reflected light from sequential ones of said photo-sensitive means and a reference time corresponding to a transmission time of said coherent light pulse.

16. An apparatus as recited in claim 15 wherein said gating means comprises a plurality of gates having respective input terminals respectively connected for receiving output signals from said outputs of said photo-sensitive means and having output terminals, said output terminals connected to said single line, and wideband amplifying means connected to receive said output signals sequentially from said single line and for shaping said output signals and for providing the shaped signals to said means for measuring time.

17. Apparatus as recited in claim 12 wherein said distance measuring means comprises a delay measuring means for determining a time delay between transmission of said signal by said transmitter means and detection of a reflected signal by any of said plurality of detecting means to determine a distance to an object in the corresponding detection area.

18. Apparatus as recited in claim 17 wherein said delay measuring means comprises means for detecting delays between transmission of said signal and detection of a reflected signal by each of said plurality of detecting means to compute longitudinal distances to each of a plurality of objects detected in a plurality of said transverse detection areas.

19. A system for measuring a distance to an object, comprising:
   a. first means responsive to a predetermined drive signal for transmitting a sequence of timed coherent light pulses to a detection region of predetermined dimensions and orientation with respect to the system;
   b. second means including means for collecting a portion of the coherent light pulses reflected by the object in the detection region and a plurality of arrayed photo-sensitive elements each respectively monitoring a distinct light receiving area of said detection region and receiving the collected coherent light reflected by said object;

c. third means for generating and outputting the drive signal to said first means and determining the distance to the object in the monitored areas of said detection region on the basis of the difference in time between timing of the drive signal and timing of reception of a received electric signal derived from each of said respective arrayed photo-sensitive elements monitoring said respective light receiving areas, and d. synchronizing means for gating each of said arrayed photo-sensitive elements for a predetermined time period in respective synchronization with said timed light pulses and for measuring a time duration within each predetermined time period, said time duration indicative of a time between transmission of said light pulse and collection of said portion of said light pulse from an object in said respective light receiving areas monitored thereby.

* * * * *